United States Patent
Knutson et al.

(10) Patent No.: US 11,914,048 B2
(45) Date of Patent: Feb. 27, 2024

(54) SYSTEM AND METHOD FOR DETERMINING VEHICLE LOCATION

(71) Applicant: APTIV TECHNOLOGIES LIMITED, St. Michael (BB)

(72) Inventors: Eric P. Knutson, Kokomo, IN (US); David M. Spell, Kokomo, IN (US); Linh Pham, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 218 days.

(21) Appl. No.: 17/242,651

(22) Filed: Apr. 28, 2021

(65) Prior Publication Data

US 2021/0247524 A1 Aug. 12, 2021

Related U.S. Application Data

(63) Continuation of application No. 16/788,567, filed on Feb. 12, 2020, now Pat. No. 11,022,698.

(51) Int. Cl.
*G01S 19/25* (2010.01)
*G01S 5/00* (2006.01)
*G01S 19/42* (2010.01)

(52) U.S. Cl.
CPC ............ *G01S 19/25* (2013.01); *G01S 5/0009* (2013.01); *G01S 19/42* (2013.01); *G01S 2205/002* (2013.01)

(58) Field of Classification Search
CPC ..... H04W 4/0229; H04W 4/021; H04W 4/02; G01S 19/25; G01S 19/42; G01S 5/0009; G01S 19/22; G01S 2205/002
(Continued)

(56) References Cited

U.S. PATENT DOCUMENTS

| 5,416,712 A | 5/1995 | Geier et al. |
| 5,587,715 A | 12/1996 | Lewis |

(Continued)

FOREIGN PATENT DOCUMENTS

| JP | H0240654 A | 2/1990 |
| JP | H08240654 A | 9/1996 |

(Continued)

OTHER PUBLICATIONS

Extended European Search Report for Application No. EP 21 15 6024 dated Sep. 7, 2021.

(Continued)

*Primary Examiner* — David Q Nguyen
(74) *Attorney, Agent, or Firm* — Harness, Dickey & Pierce, P.L.C.

(57) ABSTRACT

An illustrative example embodiment of a location determining device includes a processor that is configured to determine an indicated distance between a first detector and a source based on a signal originating at the source and detected by the detector, determine a second distance between the source and a second detector that does not have a direct signal path to the source based on a signal originating at the source and detected by the second detector, and determine a reliability of the indicated distance for determining the location by determining whether the indicated distance corresponds to a direct signal path between the first detector and the source based on a difference between the indicated distance and the second distance.

18 Claims, 2 Drawing Sheets

(58) Field of Classification Search
USPC .......................... 455/456.1, 456.3; 340/350
See application file for complete search history.

(56) References Cited

U.S. PATENT DOCUMENTS

| | | | |
|---|---|---|---|
| 5,890,090 A | 3/1999 | Nelson | |
| 8,271,189 B2* | 9/2012 | Garin | G01S 19/22 |
| | | | 701/450 |
| 8,508,404 B1 | 8/2013 | Wilmhoff | |
| 9,002,373 B2 | 4/2015 | Marti et al. | |
| 9,053,625 B2* | 6/2015 | Daniel | A43B 3/00 |
| 9,215,670 B2 | 12/2015 | Sawai et al. | |
| 9,609,477 B2 | 3/2017 | Rotstein | |
| 10,310,066 B1 | 6/2019 | Zatman et al. | |
| 10,686,782 B2* | 6/2020 | Hardt | H04W 12/126 |
| 11,585,945 B2* | 2/2023 | Ewert | G01S 19/42 |
| 2009/0191897 A1* | 7/2009 | Johnson | H04W 4/029 |
| | | | 455/456.3 |
| 2015/0035700 A1 | 2/2015 | Van Diggelen et al. | |
| 2016/0126625 A1 | 5/2016 | Gurewitz | |
| 2017/0242132 A1 | 8/2017 | Kim | |
| 2018/0180742 A1 | 6/2018 | Capet et al. | |
| 2018/0315313 A1 | 11/2018 | Klochikhin et al. | |
| 2018/0372879 A1 | 12/2018 | Whitehead | |
| 2019/0265365 A1 | 8/2019 | Skupin et al. | |
| 2020/0166344 A1 | 5/2020 | Knutson et al. | |
| 2020/0249354 A1* | 8/2020 | Yeruhami | G01S 7/4817 |
| 2020/0262392 A1 | 8/2020 | Oman et al. | |
| 2020/0341117 A1* | 10/2020 | Sandford | G01S 17/93 |
| 2021/0096266 A1 | 4/2021 | Knutson et al. | |
| 2022/0066051 A1* | 3/2022 | Hirohata | G01S 7/40 |

FOREIGN PATENT DOCUMENTS

| | | |
|---|---|---|
| JP | 2014153085 A | 8/2014 |
| KR | 20160114469 A | 10/2016 |
| WO | 2019/171633 A1 | 9/2019 |

OTHER PUBLICATIONS

First Office Action regarding Chinese Patent Application No. 202110190121.7, dated Nov. 14, 2023. Translation provided by Shanghai Patent & Trademark Law Office.

* cited by examiner

SYSTEM AND METHOD FOR DETERMINING VEHICLE LOCATION

CROSS REFERENCE TO RELATED APPLICATION

This application is a continuation of U.S. patent application Ser. No. 16/788,567, filed on Feb. 12, 2020.

BACKGROUND

Modern automotive vehicles include an increasing amount of electronic technology, such as navigation systems that are useful for route guidance or autonomous vehicle control, for example. Many navigation systems operate based on detecting satellite signals and using a known algorithm to determine the current vehicle location. The accuracy of the system depends on the quality of the received and processed satellite signals. There are situations in which satellite signals may not be entirely reliable.

For example, it is possible for satellite signals to reflect off of nearby structures before being received by the navigation system antenna or detector. Such reflections increase the distance travelled by the signal before reaching the antenna or detector compared to a signal travelling directly from the satellite to the antenna or detector. Since a known position of the satellite from which such a signal originates is used for determining the location of the vehicle, any intermediate reflection and resulting increased signal travel distance can introduce errors in the vehicle location determination.

SUMMARY

An illustrative example embodiment of a location determining device includes a processor that is configured to determine an indicated distance between a first detector and a source based on a signal originating at the source and detected by the detector, determine a second distance between the source and a second detector that does not have a direct signal path to the source based on a signal originating at the source and detected by the second detector, and determine a reliability of the indicated distance for determining the location by determining whether the indicated distance corresponds to a direct signal path between the first detector and the source based on a difference between the indicated distance and the second distance.

An illustrative example embodiment of a method includes: determining an indicated distance between a first detector and a source based on a signal originating at the source and detected by the detector, determining a second distance between the source and a second detector that does not have a direct signal path to the source based on a signal originating at the source and detected by the second detector, and determining a reliability of the indicated distance for determining the location by determining whether the indicated distance corresponds to a direct signal path between the first detector and the source based on a difference between the indicated distance and the second distance.

An illustrative example embodiment of a non-transitory storage medium includes processor-executable instructions that cause a processor to determine an indicated distance between a first detector and a source based on a signal originating at the source and detected by the detector, determine a second distance between the source and a second detector that does not have a direct signal path to the source based on a signal originating at the source and detected by the second detector, and determine a reliability of the indicated distance for determining the location by determining whether the indicated distance corresponds to a direct signal path between the first detector and the source based on a difference between the indicated distance and the second distance.

The various features and advantages of at least one disclosed example embodiment will become apparent to those skilled in the art from the following detailed description. The drawings that accompany the detailed description can be briefly described as follows.

DETAILED DESCRIPTION

Figure 1:
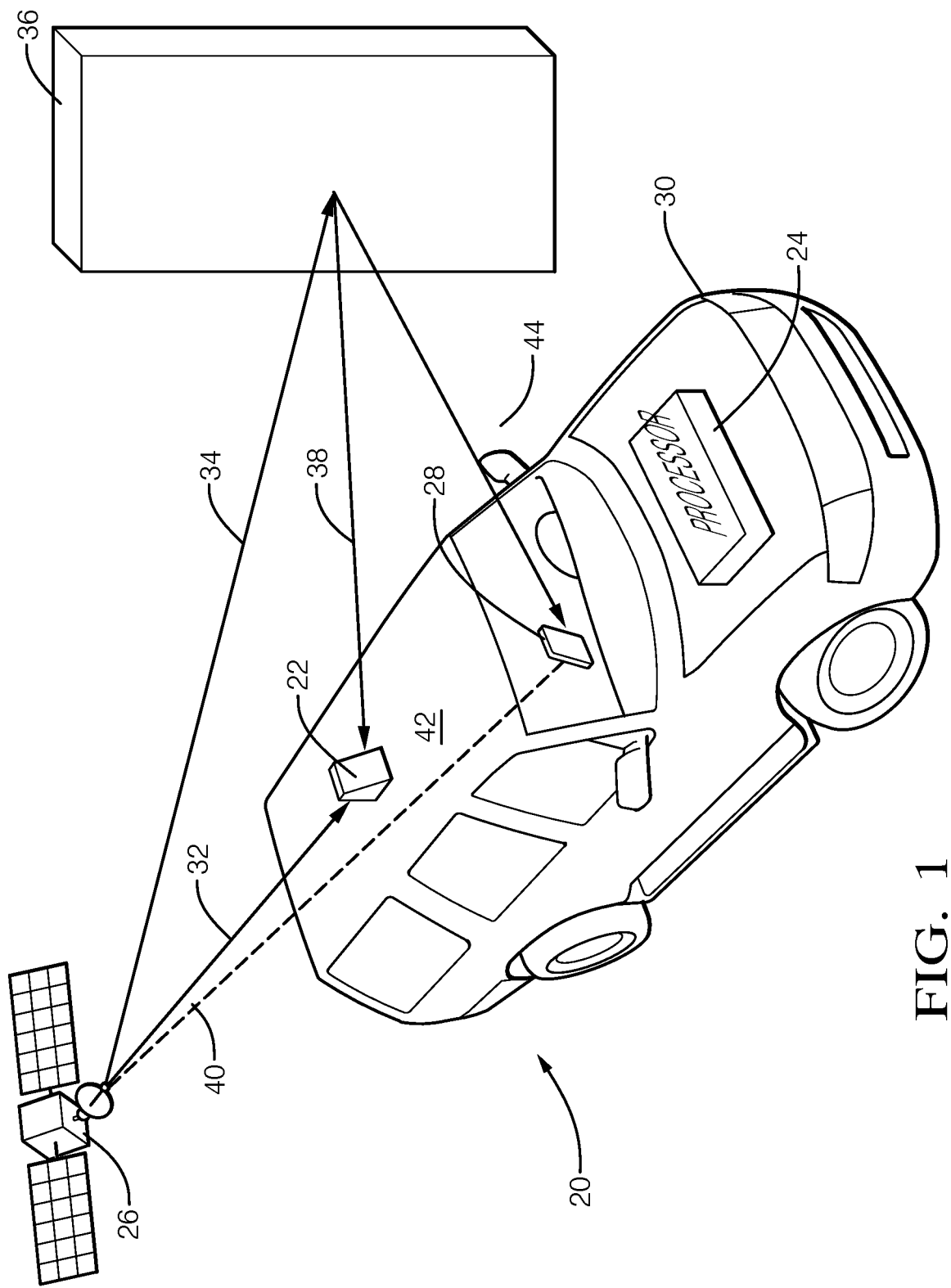
FIG. 1 schematically illustrates an example embodiment of a system for determining a location of a vehicle.

FIG. 1 schematically illustrates a system 20 including a detector 22 and a processor 24. The detector 22 includes an antenna or another device capable of detecting a signal from at least one source. In the embodiment shown in FIG. 1 the detector 22 is configured to detect satellite signals from a satellite 26. Only one satellite is shown for discussion purposes but the detector 22 will often detect multiple satellites. The detector 22 is configured to generate first signal information regarding a distance that a detected signal travels between the satellite 26 and the detector 22.

The processor 24 includes a computing device and associated memory. The processor 24 in some embodiments is a device dedicated to processing signals from the detector 22 while in other embodiments the processor 24 is a device that performs other functions that may be unrelated to processing signals from the detector 22. The processor 24 is configured to determine whether the first signal information from the detector 22 corresponds to a direct signal path between the detector 22 and the satellite 26 or if the first signal information corresponds to a reflected signal. The processor 24 makes this determination based upon second signal information from at least one other detector 28 that provides the second signal information. When the detector 28 does not have a direct signal path between it and the satellite 26, any second signal information from the detector 28 regarding a signal detected from the satellite 26 is the result of a reflected signal detected by the detector 28.

In the embodiment shown in FIG. 1, the system 20 is associated with a vehicle 30 and is useful for determining a location of the vehicle 30. The detector 28 is located within the vehicle 30 such that one or more portions of the vehicle 30 obstructs a direct signal path between the detector 28 and the satellite 26 under at least some conditions.

The condition shown in FIG. 1 includes a direct signal path 32 from the satellite 26 to the detector 22. First signal information from the detector 22 resulting from detecting a signal that travels along the direct signal path 32 is useful for determining a location of the detector 22 and the vehicle 30 because the satellite 26 has a known position relative to an earth centered earth fixed (ECEF) reference frame.

In the condition shown in FIG. 1, it is also possible for the detector 22 to detect a signal from the satellite 26 that is a reflected signal, which should not be used for making location determinations because the distance traveled by a reflected signal will introduce errors into the location determination, which is based in part on the known location of the satellite 26. For example, a signal from the satellite 26 may travel along the path shown at 34 and reflect off a structure 36, such as a building nearby the path of the vehicle 30. The reflected signal may follow a path as schematically shown at 38 and be detected by the detector 22. The distance traveled by the signal following the path 34, 38 is different than the distance of a signal following the direct signal path 32 between the satellite 26 and the detector 22. The processor 24 utilizes first signal information from the detector corresponding to a signal following the direct signal path 32 but does not use first signal information from the detector 22 resulting from a reflected signal detected by the detector 22.

The processor 24 uses second signal information from at least one other detector, such as the detector 28 situated in the vehicle 30, to determine whether the first signal information corresponds to a reflected signal. Given the current location of the satellite 26 and the position of the vehicle 30 relative to the satellite 26, no direct signal path exists between the satellite 26 and the detector 28. The potential direct signal path 40 is obstructed by the roof 42 of the vehicle 30. The position of the detector 28 in the vehicle 30 does allow for the detector 28 to detect a reflected signal from the satellite 26. For example, a signal following the path schematically shown at 34, reflecting off the structure 36 and then following the path schematically shown at 44 may pass through the windshield of the vehicle 30 and be detected by the detector 28. The processor 24 receives second signal information from the detector 28 indicating or corresponding to the distance traveled by the reflected signal following the path 34, 44. The processor 24 uses such second signal information for determining whether first signal information from the detector 22 should be used for purposes of determining a location of the detector 22 and the vehicle 30.

Figure 2:
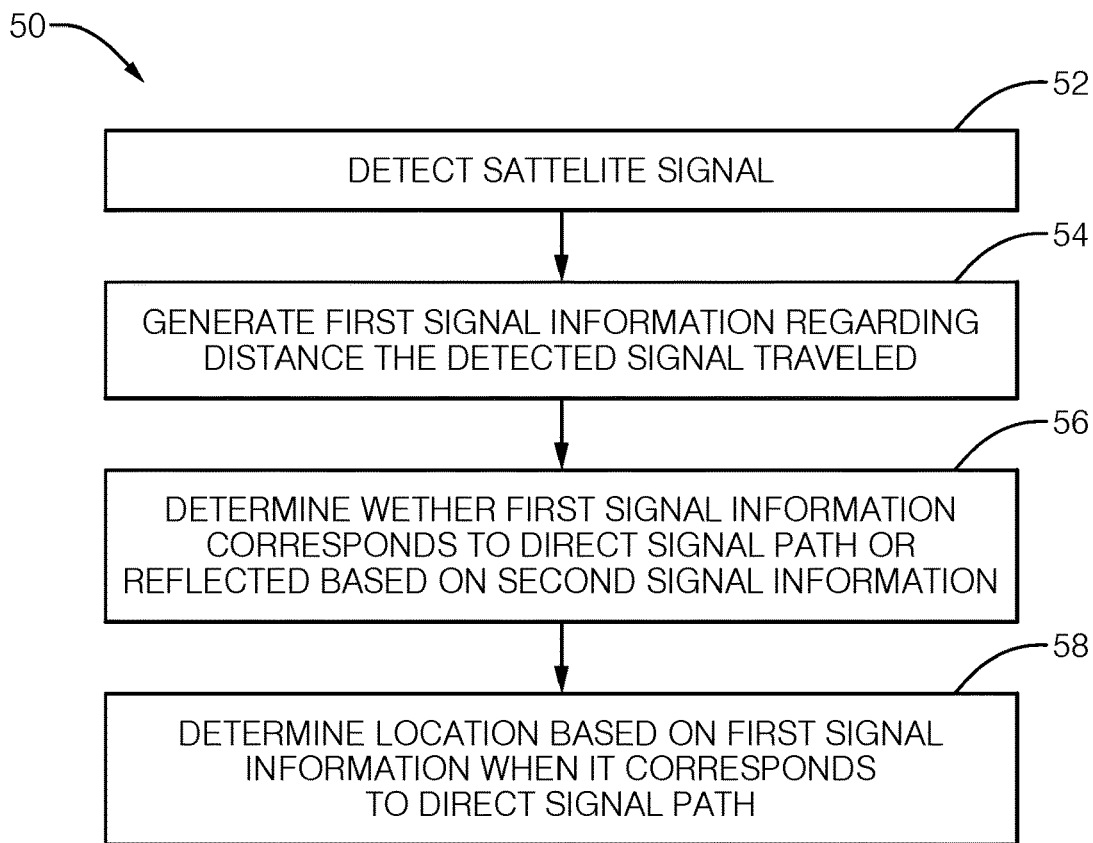
FIG. 2 is a flowchart diagram summarizing an example embodiment of a method of determining a location.

FIG. 2 includes a flowchart diagram 50 that summarizes an example method of determining the location. At 52, the detector 22 detects a signal from the satellite 26. At 54, the detector 22 generates first signal information regarding the distance the detected signal traveled between the satellite 26 and the detector 22. In this example embodiment, the first signal information comprises a pseudo range corresponding to the distance the signal traveled. The first signal information is provided to the processor 24. At 56, the processor 24 determines whether the first signal information corresponds to a direct signal path distance or a reflected distance based on second signal information from the detector 28, which is another pseudo range in this example. The processor 24 determines a difference between the distance of the first signal information and the distance of the second signal information. The processor 24 determines whether the difference between the distances of the first signal information and the second signal information is below a threshold or within a preselected range. When the second signal information is known to correspond to a reflected signal and the distance of the first signal information is sufficiently close to the distance of the reflected signal, the processor 24 determines that the first signal information is the result of the detector 22 detecting a reflected signal rather than a signal following a direct signal path between the satellite 26 and the detector 22.

For example, when the location of interest is the location of the vehicle 30, it can be assumed that any nearby structure 36 from which a satellite signal may reflect resulting in a reflected signal is at least 1.5 meters away from the vehicle 30. A reflected signal likely will travel through such a spacing twice resulting in about three meters difference between the distance traveled by the reflected signal and a direct signal path that does not involve a reflection off that nearby structure 36. In this example, whenever the difference between the distances of the first signal information and the second signal information is within three meters, the processor 24 determines that the pseudo range or distance of the first signal information is the result of a reflected signal because the second signal information is known to be the result of detecting a reflected signal.

At 58, the processor 24 determines the location of the detector 22 or the vehicle 30 based on the first signal information when the first signal information corresponds to detecting a signal received along a direct signal path. In some embodiments any signal that appears to be a reflected signal is rejected or excluded from the information used to determine the location of the vehicle 30 but some embodiments include using such signal information when a sufficiently reliable correction or adjustment can be made by the processor 24.

In some embodiments the detector 28 is part of the system 20 and situated in a known position on the vehicle 30 where the detector 28 is likely to only be able to detect reflected signals from the satellite 26. For example, the detector 28 may be situated relative to the interior of the vehicle 30 where the detector 28 will be effectively shielded by the roof of the vehicle 42 from any direct signal paths from the satellite 26 or other satellites that may be used for location determinations. In such embodiments, the second signal information from the detector 28 is always known to correspond to a reflected signal.

In other embodiments, the detector 28 may be situated on the vehicle 30 in a location where a direct satellite signal path may be obstructed depending on the relative position of the vehicle 30 and the satellite 26. For example, there may be conditions under which the detector 28 has a direct line of sight through the windshield of the vehicle 30 to one or more satellites depending on the relative positions between such satellites and the vehicle 30.

Figure 3:
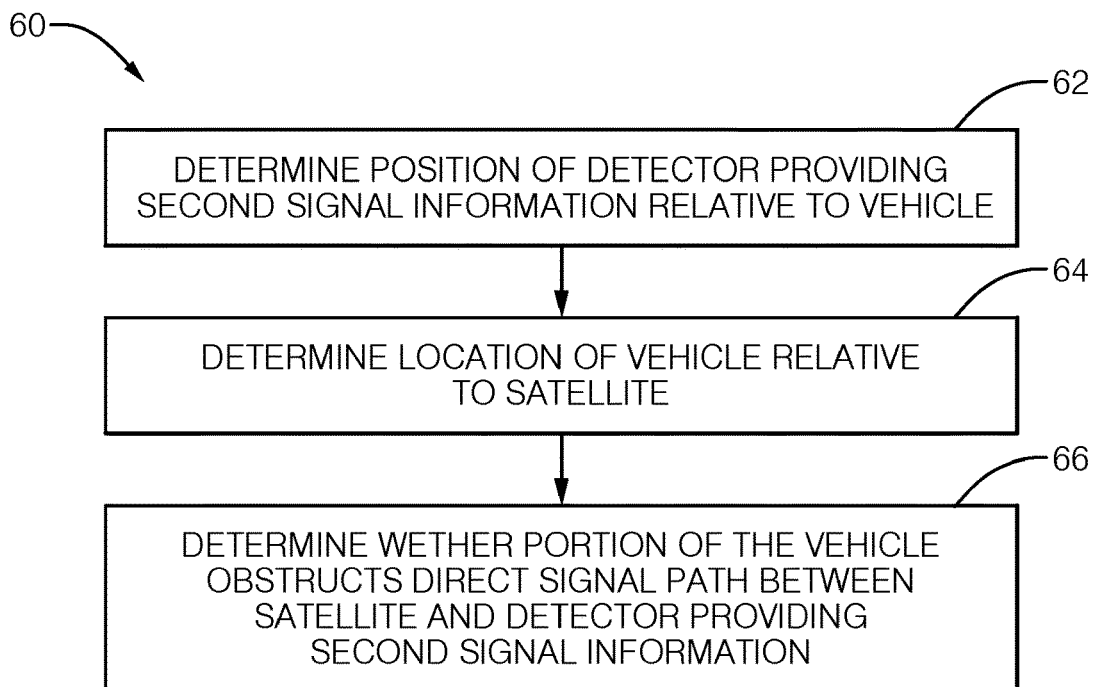
FIG. 3 is a flowchart diagram summarizing an example method of determining when a direct signal path is available between a source and a detector.

FIG. 3 includes a flowchart diagram 60 that summarizes an example technique by which the processor 24 determines whether second signal information from the detector 28 corresponds to a reflected signal. At 62, the processor 24 determines a position of the detector 28 relative to the vehicle. This may be accomplished in different ways known to those skilled in the art depending on the embodiment. When the detector 28 is in a dedicated location on or in the vehicle 30, the position of the detector 28 is known. In other embodiments, the detector 28 is moveable relative to the vehicle 30, such as when the detector 28 is a personal communication device that has GPS capability, such as a cell phone. The processor 24 in such embodiments utilizes known locating techniques for locating a position of the detector 28 relative to the vehicle 30. In an example, the position of the moveable detector relative to the vehicle is determined using radio frequency transmissions from the detector that are received by a plurality of antennas distributed about the vehicle. In this example, the plurality of antennas may be components of a passive entry/passive start (PEPS) system that may be installed on the vehicle. Details for determining the position of the moveable detector are disclosed in U.S. patent application Ser. No. 16/275,374, which is incorporated herein by reference in full.

At 64, the processor 24 determines a location of the vehicle 30 relative to the satellite 26. This may be accomplished, for example, by using a last known position or location of the vehicle 30 and the currently known position of the satellite 26, which is available through a known GNSS almanac to which the processor 24 has access. Based on that relationship and the position of the detector 28 relative to the vehicle 30, the processor 24 is able to determine whether a portion of the vehicle 30 obstructs a direct signal path between the satellite 26 and the detector 28, which provides the second signal information at 66.

In some embodiments, the processor 24 is provided with information regarding the size, shape or both of the vehicle roof 42 and uses that information combined with the relative positions of the vehicle 30 and the satellite 26 for determining when the roof 42 would obstruct a direct signal path between the detector 28 and the satellite 26.

The illustrated example embodiment provides enhanced accuracy for location determinations, such as locating a vehicle. Accurate vehicle location is useful for guided navigation or autonomous vehicle control. By eliminating reflected signals from location determinations, the example system increases the accuracy and reliability of location determinations allowing for satisfying more stringent margin of error requirements.

The various features of the disclosed embodiments are not necessarily limited to the arrangements that are shown. Other combinations of the disclosed features are possible to realize additional or different embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A location determining device, comprising
a processor and memory configured to:
determine an indicated distance between a first detector of a vehicle and a source based on a signal originating at the source and detected by the first detector,
determine a second distance between the source and a second detector based on a signal originating at the source and detected by the second detector,
determine whether a portion of the vehicle obstructs a direct signal path between the source and the second detector based on a determined position of the second detector relative to the vehicle and a determined position of the vehicle relative to the source, and
determine a reliability of the indicated distance for determining a location of the vehicle by determining whether the indicated distance corresponds to a direct signal path between the first detector and the source based on a difference between the indicated distance and the second distance and based on whether the portion of the vehicle obstructs the direct signal path between the source and the second detector.

2. The location determining device of claim 1, wherein
the indicated distance comprises a pseudo range between the source and the first detector; and
the second distance comprises a distance traveled by a reflected signal between the source and the second detector.

3. The location determining device of claim 2, wherein the processor is configured to determine that the indicated distance corresponds to a reflected signal by
determining a difference between the pseudo range and the second distance and
determining that the difference between the pseudo range and the second distance is below a threshold.

4. The location determining device of claim 2, wherein the processor is configured to determine that the indicated distance corresponds to a reflected signal by determining that the pseudo range is greater than the second distance.

5. The location determining device of claim 1, wherein
the processor is configured to determine the location of the vehicle when the determined reliability corresponds to the indicated distance being reliable for determining the location of the vehicle.

6. The location determining device of claim 1, wherein
the portion of the vehicle comprises a vehicle roof; and
the processor uses information regarding at least one of a size of the vehicle roof and a shape of the vehicle roof to determine that the vehicle roof obstructs the direct signal path between the source and the second detector.

7. The location determining device of claim 1, wherein the second detector is situated in a known position relative to the portion of the vehicle that obstructs the direct signal path between the second detector and the source.

8. The location determining device of claim 1, wherein the source is a satellite having a known location within an earth centered earth fixed reference frame.

9. A method for determining a location of a vehicle, the method comprising:
determining an indicated distance between a first detector of the vehicle and a source based on a signal originating at the source and detected by the first detector,
determining a second distance between the source and a second detector based on a signal originating at the source and detected by the second detector,
determining whether a portion of the vehicle obstructs a direct signal path between the source and the second detector based on a determined position of the second detector relative to the vehicle and a determined position of the vehicle relative to the source, and
determining a reliability of the indicated distance for determining the location of the vehicle by determining whether the indicated distance corresponds to a direct signal path between the first detector and the source based on a difference between the indicated distance and the second distance and based on whether the portion of the vehicle obstructs the direct signal path between the source and the second detector.

10. The method of claim 9, wherein
the indicated distance comprises a pseudo range between the source and the first detector; and
the second distance comprises a distance traveled by a reflected signal between the source and the second detector.

11. The method of claim 10, comprising determining that the indicated distance corresponds to a reflected signal by
determining a difference between the pseudo range and the second distance and
determining that the difference between the pseudo range and the second distance is below a threshold.

12. The method of claim 10, comprising determining that the indicated distance corresponds to a reflected signal by determining that the pseudo range is greater than the second distance.

13. The method of claim 9, wherein the method further includes determining the location of the vehicle when the determined reliability corresponds to the indicated distance being reliable for determining the location of the vehicle.

14. The method of claim 9, wherein the portion of the vehicle comprises a vehicle roof and the method comprises using information regarding at least one of a size of the vehicle roof and a shape of the vehicle roof to determine that the vehicle roof obstructs the direct signal path between the source and the second detector.

15. The method of claim 13, wherein the second detector is situated in a known position relative to the portion of the vehicle that obstructs the direct signal path between the second detector and the source.

16. The method of claim 9, wherein the source is a satellite having a known location within an earth centered earth fixed reference frame.

17. A non-transitory storage medium including processor-executable instructions that cause a processor to
   determine an indicated distance between a first detector of a vehicle and a source based on a signal originating at the source and detected by the first detector,
   determine a second distance between the source and a second detector based on a signal originating at the source and detected by the second detector,
   determine whether a portion of the vehicle obstructs a direct signal path between the source and the second detector based on a determined position of the second detector relative to the vehicle and a determined position of the vehicle relative to the source, and
   determine a reliability of the indicated distance for determining a location of the vehicle by determining whether the indicated distance corresponds to a direct signal path between the first detector and the source based on a difference between the indicated distance and the second distance and based on whether the portion of the vehicle obstructs the direct signal path between the source and the second detector.

18. The non-transitory storage medium of claim 17, wherein
   the source is a satellite having a known location relative to an earth centered earth fixed reference frame;
   the indicated distance comprises a pseudo range between the satellite and the first detector; and
   the second distance comprises a distance traveled by a reflected signal between the source and the second detector.

* * * * *